United States Patent [19]

Harisiades et al.

[11] Patent Number: 5,157,093
[45] Date of Patent: Oct. 20, 1992

[54] HYDROXYETHYL CELLULOSE DERIVATIVES CONTAINING PENDANT (METH)ACRYLOYL UNITS BOUND THROUGH URETHANE GROUPS AND HYDROGEL CONTACT LENSES MADE THEREFROM

[75] Inventors: Paul Harisiades, Woodhaven; Ellen Rennwant, North Tarrytown, both of N.Y.

[73] Assignee: Ciba-Geigy Corporation, Ardsley, N.Y.

[21] Appl. No.: 701,331

[22] Filed: May 9, 1991

Related U.S. Application Data

[62] Division of Ser. No. 521,803, May 10, 1990, abandoned.

[51] Int. Cl.$^5$ .......................... C08F 8/30; C08G 18/06
[52] U.S. Cl. ...................................... 527/301; 522/89; 526/238.21; 528/69
[58] Field of Search ............... 526/238.21; 527/301; 528/69

[56] References Cited

U.S. PATENT DOCUMENTS

| | | | |
|---|---|---|---|
| 3,749,592 | 7/1973 | Gaske et al. | 522/89 |
| 3,782,950 | 3/1972 | Ranz et al. | 96/85 |
| 3,900,250 | 10/1973 | Ivani et al. | 351/160 |
| 4,111,535 | 10/1976 | Loshaek et al. | 351/160 |
| 4,116,549 | 1/1976 | Harris et al. | 351/160 |
| 4,223,984 | 4/1979 | Miyata et al. | 351/160 H |
| 4,231,905 | 11/1980 | Neefe | 260/17 A |
| 4,260,228 | 1/1980 | Miyata et al. | 351/160 H |
| 4,264,155 | 7/1979 | Miyata et al. | 351/160 H |
| 4,365,000 | 12/1982 | Mueller et al. | 428/239 |
| 4,366,070 | 12/1982 | Block | 252/8.5 A |
| 4,395,496 | 7/1983 | Wittmann et al. | 523/107 |
| 4,473,479 | 9/1984 | Block | 252/8.5 A |
| 4,532,267 | 7/1985 | Allan | 523/106 |
| 4,532,277 | 7/1985 | Wingler | 524/37 |
| 4,565,857 | 1/1986 | Grant | 527/301 |
| 4,665,123 | 5/1987 | Goldenberg | 525/59 |
| 4,670,506 | 6/1987 | Goldenberg | 525/59 |
| 5,010,155 | 4/1991 | Mueller | 527/301 |

Primary Examiner—Joseph L. Schofer
Assistant Examiner—Fred Zitomer
Attorney, Agent, or Firm—Luther A. R. Hall; William G. Hervey

[57] ABSTRACT

The instant invention relates to methacrylate functionalized hydroxyethyl cellulose which is crosslinked with conventional vinylic monomers to form soft hydrogel contact lenses possessing high oxygen permeability, wettability, and mechanical strength.

13 Claims, No Drawings

HYDROXYETHYL CELLULOSE DERIVATIVES CONTAINING PENDANT (METH)ACRYLOYL UNITS BOUND THROUGH URETHANE GROUPS AND HYDROGEL CONTACT LENSES MADE THEREFROM

This is a division of application Ser. No. 521,803 filed May 10, 1990.

BACKGROUND OF THE INVENTION

The instant invention relates to hydroxyalkylated cellulose (i.e. HEC) derivatives containing pendant (meth)acryloyl units bound to the cellulose backbone, through urethane groups, which are further reacted with a conventional vinylic monomer, and which can be crosslinked to form soft hydrogel contact lenses possessing high oxygen permeability, wettability and mechanical strength.

Hydroxyethyl cellulose has not been proposed as a contact lens material. Vision correction lenses such as contact lenses and intraocular lenses have been known as commercial products for over 25 years. An acceptable lens must be optically clear, mechanically stable, and must provide sufficient optical correction, gas permeability and wettability to insure that the lens is comfortable and safe during use. Gas permeability is important since the corneal surface of the eye respires by obtaining oxygen and other substances from tear fluid and by releasing carbon dioxide and other products of respiration into tear fluid. The intimate contact and position of the contact lens can substantially prevent the exchange of such Constituents between the corneal epithelial cells and tear fluid. As a result the cornea can become starved for oxygen and can accumulate harmful amounts of metabolites within the constituent cells. This can result in corneal edema (swelling) and often extreme discomfort to the wearer. Wettability of the lens is important because a nonwettable lens can be abrasive and irritating to the eye and lid and can cause significant wearer discomfort. A lens must have sufficient mechanical integrity to allow for easy cleaning and handling and maintaining the desired curvature and correction for the individual user. The lens should be immunologically compatible with the eye reducing chances of allergic reaction or toxic response. Further the lens should be permanently dyeable easily manufactured and available at low cost.

In the past contact lenses have been made from synthetic polymeric materials such as plastic matrices based on polyacrylates, polymethacrylates, poly(hydroxyethyl methacrylate), cellulose acetate butyrate, silicones, etc. More recently contact lenses have been made from collagen, a naturally occurring protein. Miyata, U.S. Pat. No. 4,223,984 is primarily directed to a contact lens made from solubilized defatted transparent crosslinked collagen. Miyata U.S. Pat. No. 4,260,228 is particularly directed to an improved collagen gel soft contact lens prepared from an aldehyde crosslinked gel containing a polyhydroxy compound such as glucose. Miyata, U.S. Pat. No, 4,264,155 is primarily directed to an improved lens made from collagen gel to which a water soluble organic polyhydroxy polymer has been added.

Ivani, U.S. Pat. No. 4,365,000 discloses certain polymeric aminopolysaccharide compositions used in the fabrication of contact lenses which are limited to graft and block copolymers of an acetyl glycosamine in combination with compounds selected from the group consisting of silicone collagen, acrylonitrile, acrylamide, alkyl methacrylates, alkylamino alkylmethacrylates, hydroxyalkyl methacrylates, pyrrolidones and vinyl derivatives of pyrrolidone.

Allan, U.S. Pat. No. 4,532,267 teaches a method for the production of hard or soft contact lens based on the aminopolysaccharide chitin.

Cellulose esters, especially cellulose acetate butyrate, have been disclosed for contact lens applications. These are not hydrogel materials, have relatively low oxygen permeabilities, and are not dimensionally stable.

Cellulose acetate butyrate (CAB) contact lenses are disclosed in U.S. Pat. No. 3,900,250.

Harris, et. al., U.S. Pat. No. 4,116,549 discloses a (CAB) lens material with an anti-warping treatment.

Neefe, U.S. Pat. No. 4,231,905 discloses a contact lens formed by dissolving a cellulose ester or ether in methyl methacrylate followed by polymerization.

Wittmann, et. al., U.S. Pat. No. 4,395,496 improved the dimensional stability of CAB by crosslinking it with trialkoxysilane methacrylates and diacrylates.

Loshack, et. al., U.S. Pat. No. 4,111,535 discloses a cellulose acetate propionate lens plasticized with dihexyl acrylate.

Lenses made from polymer blends of cellulose esters and ethylene/vinyl acetate have been disclosed with improved wettability compared to CAB lenses.

Wingler, U.S. Pat. No. 4,532,277 blends cellulose acetate butyrate with ethylene/vinyl acetate (EVA) to make a lens with 2% water content.

While cellulosics and polysaccharides bearing hydroxyl groups have been crosslinked with epichlorohydrin, diepoxides, acetals, diisocyanates, divinyl sulfone, and other hydroxyl reactive groups, hydrogel contact lenses composed of crosslinked hydroxyethyl cellulose are not disclosed in the prior art.

Previously, hydroxyethyl cellulose has been crosslinked with hydroxyl reactive groups such as epoxides, formaldehyde, glyoxal, dimethylol urea and the like.

Zemek et. al. *Synth Polymer Membr,* Proc. Microsymp Macromol., 29th, 1986, 463-9 synthesized membranes of hydroxyethyl cellulose by crosslinking it with 2-chloromethyl oxirane.

Masuda, JP 61/244369 A2, 10-30-86, discloses polysaccharide gels crosslinked with diepoxides.

Pokludova and Smejkal, *Kozarstvi,* 35(11), 329-34 crosslink hydroxyethyl cellulose for use in leather finishing, with Depremol M (4,5-dihydroxy-N,N'-dimethylolethylene urea).

Block, U.S. Pat. No. 4,473,479, crosslinks hydroxyethyl cellulose with glyoxal.

Stresinka, et. al., C.S.201185B disclose the use of 1-4 divalent hydroxamine acids as masked isocyanates for the crosslinking of hydroxyethyl cellulose.

Block, U.S. Pat. No. 4,366,070, reacts hydroxyethyl cellulose with formaldehyde to give a crosslinked system with good fluid loss and pseudoplasticity.

Shitama et. al., JP 54/22949 describe the manufacture of microcapsules by crosslinking hydroxyethyl cellulose with hexamethylene diisocyanate.

Pastyr and Kuniak, CS 172,160, describe a method for crosslinking hydroxyethyl cellulose fibers using dimethylolurea and glyoxal at 80°-130° C.

Pikler et. al., CS 166,076, crosslink hydroxyethyl cellulose with alkyl or aryl phosphites in dimethyl sulfoxide.

Pikler and Piklerova, CS 166,529, crosslink hydroxyethyl cellulose with Ce (IV) salts in the preparation of fibers and films with decreased water absorption.

The chemical reaction between hydroxyethyl cellulose and 2-isocyanatoethyl methacrylate in dimethyl sulfoxide had not been disclosed in the prior art. Ethylenically unsaturated cellulose esters have been disclosed by Grant, U.S. Pat. No. 4,565,857, for coating applications. In this case, the reaction of cellulose acetate butyrate containing 4.3% hydroxyl groups with 2-isocyanatoethyl methacrylate is used to make protective coatings for wood and other substrates.

Rama, et. al., U.S. Pat. No. 3,782,950, describe the reaction of hydroxypropyl cellulose with 2-isocyanatoethyl methacrylate for a reactive-type coating.

Goldenberg, U.S. Pat. No. 4,665,123 describes hydrogel contact lenses made from polyvinyl alcohol derivatives reacted with 2-isocyanatoethyl methacrylate in dimethyl sulfoxide solution and actinically crosslinked with (meth)acrylic monomers.

It is a further object of this invention to provide a means of crosslinking hydroxyethyl cellulose that provides crosslinked products of high mechanical strength at high water contents.

It is the object of this invention to provide cellulosic derivatives containing pendant (meth)acryloyl groups which are further reacted with a conventional vinylic monomer, and crosslinked to form a soft water-swellable hydrogel contact lens having high mechanical strength, high water content, superior optical clarity and high oxygen permeability.

It is a further object of the present invention to provide aqueous swollen contact lenses obviating, or substantially reducing, the drawbacks of the prior art.

It is a further object of the present invention to provide a method for preparing such contact lenses by crosslinking such cellulosic polymer containing (meth)acryloyl unit-vinylic monomer reaction products in an organic aprotic solvent in a mold, such as a spin cast mold or a static cast mold, and equilibrating the resulting aprotic solvent swollen contact lens in an aqueous medium.

DETAILED DESCRIPTION OF THE INVENTION

The instant invention provides an organic aprotic solvent insoluble polymer which is the copolymerization product of (A) a derivative of hydroxyethyl cellulose, with a D.S. value of 0.5 to 3.0 and an M.S. value of 1.5–3.0, and having a weight average molecular weight of at least 10,000, containing between about 0.5 to 90 percent, based on the total number of hydroxyl groups on said hydroxyethyl cellulose, of a repeating structural unit of the formula

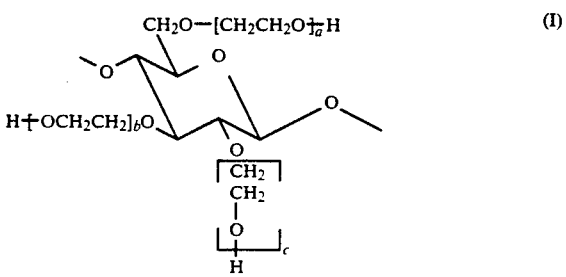     (I)

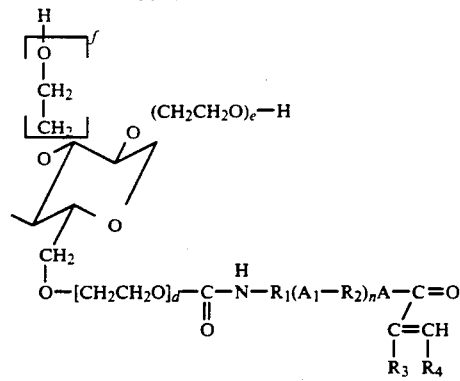

with (B) a vinylic monomer
wherein
$a+b+c+d+e+f \geq 3$, with a urethane bond at any one or more of the six possible hydroxyl positions, $R_1$ and $R_2$ are independently straight or branched chain alkylene of 2 to 8 carbon atoms, arylene of 6 to 12 carbon atoms a saturated cycloaliphatic divalent group of 6 to 15 carbon atoms, aralkylene of 7 to 14 carbon atoms, or aralkarylene of 13 to 16 carbon atoms;

n is 0 or 1;

$A_1$ is

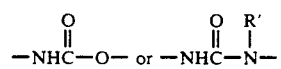

where $R'$ is hydrogen or lower alkyl.,

A is —O—, —NH— or

where $R''$ is hydrogen or lower alkyl;

$R_3$ is hydrogen or methyl; and $R_4$ hydrogen, methyl or —COOR$_5$ where $R_5$ is hydrogen or lower alkyl with the proviso that if $R_3$ is methyl, $R_4$ is hydrogen; where for each repeating structural unit of formula I there are 0.01 to 80 repeating structural units derived from the vinylic monomer.

When $R_1$ or $R_2$ are alkylene, they may be straight or branched chain, preferably of 2 to 6 carbon atoms, more preferably straight chain alkylene, and most preferably ethylene. Suitable examples include ethylene, propylene, butylene, hexylene and dimethylethylene.

Where $R_1$ or $R_2$ are arylene, they are preferably phenylene which is unsubstituted or substituted by lower alkyl or lower alkoxy, and more preferably 1,3- or 1,4-phenylene.

Where $R_1$ or $R_2$ are saturated cycloaliphatic divalent group, such group preferably is cyclohexylene or cyclohexylmethylene which is unsubstituted or substituted by one or more methyl groups, such as the isophorone divalent radical.

Where $R_1$ or $R_2$ are aralkylene, the aryl moiety thereof is preferably phenylene which is unsubstituted or substituted by methyl or methoxy and the alkylene moiety thereof is preferably lower alkylene, such as methylene or ethylene, most preferably methylene.

The divalent group $A_1-R_2$ is present when n is 1 and absent when n is zero; those polymers wherein n is 0 are preferred.

$A_1$, when present, is preferably carbamoyloxy. When $A_1$ is is a ureido, R' is preferably hydrogen.

A is preferably —O—. When A is ureido, R" is preferably lower alkyl.

$R_3$ is preferably methyl.

$R_4$ is preferably hydrogen. Where $R_3$ is hydrogen, $R_4$ is methyl or —COOR$_5$, where $R_5$ is preferably methyl or ethyl.

The hydroxyethyl cellulose derivatives containing units of formula I are easily prepared by reacting a hydroxyethyl cellulose, with a D.S. value of 0.5 to 3.0 and an M.S. value of 1.5 to 3.0, and having a weight average molecular weight of at least 10,000, containing i.e. units of formula II such as stannous octoate or dibutyltin dilaurate, or sodium acetate.

Hydroxyethyl celluloses containing units of formula II are widely available.

By hydroxyethyl cellulose is meant cellulose which has been swelled in caustic and reacted with ethylene oxide. The manner in which ethylene oxide is added to cellulose can be described by the terms degree of substitution (D.S.) and molar substitution (M.S.). The degree of substitution designates the average number of hydroxyl postions on the anhydroglucose unit that have reacted with ethylene oxide. See Formula II. Molar substitution is defined as the average number of ethylene oxide molecules that have reacted with each anhydroglucose unit. In the instant invention D.S. is at least 0.5 and maximally 3.0 and preferably 0.9 to 1.0. The CELLOSIZE (Union carbide) hydroxyethyl cellulose

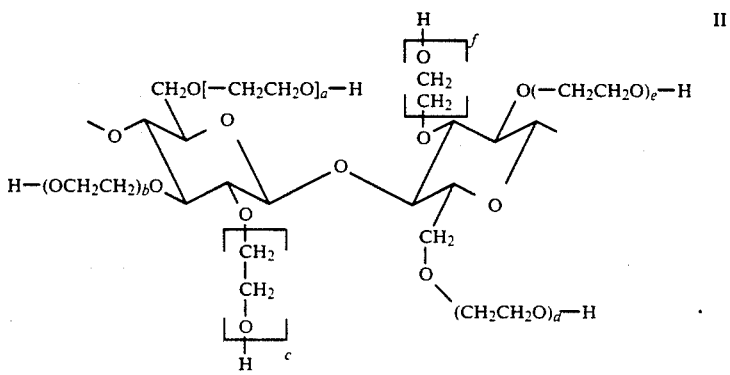

II used in the Examples has an M.S. value of about 2. The M.S. for hydroxyethyl cellulose is generally in the range of 1.5 to 3.0.

Preferably, the hydroxyethyl cellulose has a weight average molecular weight of at least 10,000.

As an upper limit, the hydroxyethyl cellulose may have a weight average molecular weight of 500,000. Preferably, the HEC has a weight average molecular weight of up to 350,000, more preferably up to 200,000, and most preferably up to 120,000.

The isocyanates of formula III are known, or are easily prepared by conventional methods well known in the art (see U.S. Pat. No. 2,958,704).

Where, in the compounds of formula III, n equals 1, the isocyanates can be prepared, for example, by reacting substantial equimolar amounts of a compound of the formula:

$$OCN-R_1-NCO \qquad (IV)$$

with a compound of the formula

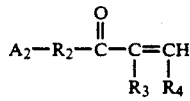

(V)

where $A_2$ is HO— or R'—NH— and $R_2$, A, $R_3$ and $R_4$ are as above defined. Occassionally, it is desirable to employ a substantial excess of the diisocyanate of formula IV in this reaction, in order to minimize the formation of by product, and subsequently isolate the compound the formula III from the resulting reaction mixture by precipitation thereof, or by distilling off the with about 0.5 to about 90 percent, based upon the total number of hydroxyl groups in said hydroxyethyl cellulose of an isocyanate of formula III

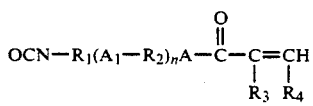 (III)

wherein $R_1$, $R_2$, n, A, and $R_3$ are as above defined, and $R_4$ is hydrogen, methyl or —COOR$_5$ where $R_5$ is lower alkyl, at a temperature between about −10° C. to about 100° C. in the presence of a conventional aprotic solvent, in the further presence or absence of a catalytic amount of a urethane catalyst.

To obtain those hydroxyethyl cellulose polymer derivative containing units of formula I wherein $R_5$ is hydrogen, the corresponding polymers wherein $R_5$ is lower alkyl can subsequently be treated with aqueous base, such as an alkali metal hydroxide aqueous solution, at an elevated temperature, e.g. between about 40° to about 80° C. followed by neutralization of the resulting carboxylate salt with an acid, such as aqueous hydrochloric acid under ambient conditions.

Suitable aprotic solvents for conducting the reaction between the units of formula II and the isocyanate of formula III include formamide, N,N-dimethylformamide, phosphoric acid tri-dimethylamide, N-methyl-2-pyrrolidone, N,N-dimethylacetamide, acetamide, acetonitrile and preferably dimethyl sulfoxide.

Suitable urethane catalysts include tertiary amines, such as trimethylamine, triethylamine, N,N-dimethylbenzylamine, or an organometallic urethane catalyst, excess isocyanate. The reaction between the compound IV and compound V can be conducted at a temperature between about 0° C. and 100° C. in the presence or absence of an inert solvent. Suitabe solvents include toluene cyclohexane, methyl acetate ethyl acetate, tetrahydrofuran, isopropyl acetate, diethyl ether and the like. If desired, the reaction between IV and V may be conducted in the presence of a urethane catalyst of the type described above.

The compounds of formula IV and V are well known in the art. Suitable diisocyanates of formula IV include hexane-1,6-diisocyanate, tetramethylene diisocyanate, phenylene-1,4-diisocyanate, toluene-2,4-diisocyanate, toluene-2,6-diisocyanate, isophorone diisocyanate, cyclohexane-1-4-diisocyanate, and the like.

Suitable compounds of formula V include 2-hydroxyethyl acrylate, 2-hydroxypropyl acrylate, 4-hydroxyphenyl methacrylate, 2-hydroxyethyl maleate, 2-hydroxyethyl methacrylate, 2-t-butylaminoethyl methacylate, and the like.

Many of the compounds of formula III wherein n is 0 are known or can be prepared by methods known in the art. Known compounds include 2-isocyanatoethyl methacrylate, 2-isocyanatoethyl acrylate, 3-isocyanatepropyl methacrylate, 4-isocyanatobutyl acrylate and methacrylate, 6-isocyanatohexyl acrylate and methacrylate, 1-methyl-2-isocyanatoethyl methacrylate and 1,1-dimethyl-2-isocyanatoethyl acrylate.

The compounds of formula III wherein n is 0 can generally be prepared by esterification of acryloyl or methacrylol chloride with substantially equal molar amounts of the appropriate amine of formula (VI).

$$H_2N-R(A_1-R_2)_nOH \qquad (VI)$$

under acidic conditions followed by phosgenation, as described in U.S. Pat. No. 2,821,544 (1958). The compounds of formula (VI) are conventional and well known in the art. More specifically, the esterification reaction as well as the phosgenation reaction is run using an inert, dry, high-boiling solvent such as toluene, xylene, chlorobenzene or dichlorobenzene at 50°-200° for 1 to 20 hours. The alkanolamine can either be added in the salt form, preferably the hydrochloride salt, or the free form with the solvent saturated with the dry acid e.g. dry HCl gas. After formation of ester, excess phosgene is passed into or over the rapidly stirring suspension (or solution) at 50°-200° C. for 1 to 20 hours until evolution of hydrogen chloride ceases. The product is isolated by distillation.

The vinylic monomer may be hydrophilic, hydrophobic or may be a mixture of hydrophilic and hydrophobic vinylic monomers. Suitable vinylic monomers include those conventional vinylic monomers generally employed in the fabrication of soft and hard contact lenses. By a hydrophilic vinylic monomer is meant a monomer which when polymerized by conventional free radical polymerization, characteristically, yields a polymer which either dissolves in water or is capable of absorbing at least 10% by weight water under a ambient equilibrium conditions. Similarly, suitable hydrophobic vinylic monomers are those monomers which, when polymerized by conventional free radical polymerization, characteristically yield a polymer which neither dissolves in water, nor is capable of absorbing at least 10% by weight water under ambient (i.e. 20° C.) equilibrium conditions.

In general, between 0.01 and about 80 units of conventional hydrophobic and/or hydrophilic monomer is reacted per unit of formula I.

The polymers of the instant invention preferably contain at least about 1 to about 50 percent, based on the total number of hydroxyl groups on the hydroxyethyl cellulose, of units of formula I, which are reacted with 0.01 to about 80 units of conventional vinylic monomer.

In one preferred sub-embodiment of the instant invention, the hydroxyethyl cellulose derivation contains at least about 10 to about 50, preferably between 12 to about 27 percent, based on the number of hydroxyl groups on said hydroxyethyl cellulose of units of formula I, which are reacted with 0.01 to 80 units of a vinylic monomer per unit of formula I, more preferably between about 0.5 to about 30 units of vinylic monomer per unit of formula I, and most preferably between 2 to about 20 units of vinylic monomer per unit of formula I present in the hydroxyethyl cellulose polymer. In the preferred sub-embodiment, it is generally desirable to employ a hydrophobic vinylic monomer as the monomer reactant, or alternatively, a mixture of hydrophobic and hydrophilic monomers containing at least 50 weight percent of hydrophobic monomer, based on total monomer, being employed. The added hydrophobic monomer, or monomer mixture containing predominatly hydrophobic monomer, has been found to increase the mechanical strength of the ultimate final product soft contact lens material, to reduce the amount of water contained in the contact lens material, and reduce the pore size of the contact lens material, thereby reducing the rate of accumulation of proteinaceous and non-proteinaceous debris associated with the normal day-to-day wearing and handling of contact lenses. Surprisingly, and most unexpectedly, the introduction of hydrophobic monomer, or monomer mixture containing at least 50 mole percent hydrophobic monomer, to the hydrophilic hydroxyethyl cellulose containing units of formula I does not, upon reaction, result in phase separation of the reaction product. Rather the product is optically clear, indicating substantially no phase separation.

As the percent of formula I units increase, from about 1% to about 50%, based upon the total number of hydroxyl groups in the hydroxyethyl cellulose, the added vinylic monomer reacted therewith is generally increasingly hydrophilic in character for an optimum balance of performance characteristics in terms of mechanical strength, water content, surface wettability and oxygen permeability.

The vinylic monomers are reacted with the hydroxyethyl cellulose derivative of formula I advantageously in the presence of an inert diluent or solvent such as a suitable organic solvent including a lower alkanol, N,N-dimethylformamide, acetamide, acetonitrile, N N-dimethylacetamide dimethyl sulfoxide or mixtures thereof. Also, aqueous/organic solvent systems may be employed.

The vinylic monomer, or blend of vinylic monomers, are combined with the hydroxyethyl cellulose derivative of formula I and polymerized in the presence of the actinic radiation or in the presence of a conventional free radical initiator, such as a peroxide, e.g. di-tert butyl peroxide, benzoyl peroxide, lauryl peroxide, decanoyl peroxide, acetyl peroxide, succinic acid peroxide, methyl ethyl ketone peroxide, 2,4-dichlorobenzoyl peroxide, isopropyl peroctoate, tert-buty hydroperoxide, tert-butyl perpivalate, tert-butyl peroctoate, diisppropyl peroxydicarbonate, cumene hydroperoxide, tert-butyl perbenzoate, tert-butyl peroxymaleic acid, tert-butyl peroxyacetate, and potassium persulfate; an azo compound e.g. 2,2-azo-bisisobutyronitrile, 2,2'-azo-bis-(2,4-dimethylvaleronitrile), 1,1'-azo-bis(cyclohexane carbonitrile), 2,2'-azo-bis(2,4-dimethyl-4-methoxyvaleronitrile) and phenyl-azo-isobutyronitrile; a photoinitiator e.g. benzoin methyl ether and 1-hydroxycyclohexyl phenyl ketone or actinic radiation such as UV light or ionizing rays e.g. gamma rays or x-rays.

Suitable vinylic monomers for polymerization with the derivative of formula I include conventional hydrophobic and hydrophilic monomers. Suitable hydrophobic monomers include, without limitation $C_1$ to $C_{18}$ alkyl acrylates and methacrylates, $C_8$ to $C_{18}$ alkyl acrylamides and methacrylamides, acrylonitrile, methacrylonitrile, vinyl $C_1$ to $C_{18}$ alkanoates, $C_2$ to $C_{18}$ alkenes, $C_2$ to $C_{18}$ haloalkenes, styrene, $C_1$ to $C_6$ alkyl styrenes, vinyl alkyl ethers wherein the alkyl portion has 1 to 6 carbon atoms, $C_3$–$C_{12}$ perfluoroalkyl-ethyl-thiocarbonylaminoethyl acrylates and methacrylates, $C_3$–$C_{12}$-fluoroalkyl acrylates and methacrylates, acryloxy and methacryloxy-alkyl-siloxanes, N-vinyl carbazole, $C_1$–$C_{12}$ alkyl esters of maleic, fumaric, itaconic, and mesaconic acids and the like. Examples of suitable hydrophobic monomers include methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, vinyl acetate, vinyl propionate, vinyl butyrate, vinyl valerate, styrene, chloroprene, vinyl chloride, vinylidine chloride, acrylonitrile, 1-butene, butadiene, methacrylonitrile. vinyl toluene, vinyl ethyl ether, per-fluorohexylethylthiocarbonylaminoethyl methacrylate, isobornyl methacrylate, hexafluorobutyl methacrylate, 3-methacryloxypropylpentamethyl-disiloxane and bis(methacryloxypropyl) tetramethyldisiloxane.

Suitable hydrophilic monomers include, without limitation, hydroxy substituted lower alkyl acrylates and methacrylates, acrylamide, methacrylamide, $C_1$–$C_2$ lower alkyl acrylamide and methacrylamide, ethoxylated acrylates and methacrylates, hydroxy substituted lower alkyl acrylamide and methacrylamide, hydroxy substituted lower alkyl vinyl ethers, sodium ethylene sulfonate, sodium styrene sulfonate, 2-acrylamido-2-methylpropanesulfonic acid, N-vinylpyrrole, N-vinylsuccinimide, N-vinyl pyrrolidone, 2 and 4-vinyl pyridine, acrylic acid, methacrylic acid, amino (by amino including quaternary ammonium), monolower alkylamino- or di-lower alkylamino-lower alkyl acrylates or methacylates, allyl alcohol and the like.

Specific hydrophilic monomers include 2-hydroxyethyl methacrylate, 2-hydroxyethyl acrylate, acrylamide, methacrylamide, N-N-dimethylacrylamide, allyl alcohol, vinyl pyridine, N-vinyl-2-pyrrolidone, glycerol methacrylate, N-(1,1-dimethyl-3-oxobutyl)-acrylamide, and the like.

Preferred hydrophobic monomers are methyl methacrylate and vinyl acetate.

Preferred hydrophilic monomers are 2-hydroxyethyl methacrylate, N-vinyl-2-pyrrolidone, and acrylamide.

Optionally, an additional conventional polyreactive crosslinking agent may be added, such as allyl compounds, e.g. allyl methacrylate, diallyl itaconate, monoallyl itaconate, diallyl maleate, diallyl fumarate, diallyl succinate, diallyl phthalate, triallyl cyanurate, triallyl isocyanurate, diethylene glycol bis-allyl carbonate, triallyl phosphate, triallyl trimellitate, allyl ether, N,N-diallylmelamine, vinyl compounds, e.g. divinyl benzene, N,N'-methylene-bis-acrylamide, ethylene glycol dimethacrylate, neopentyglycol dimethacrylate, tetraethylene glycol dimethacrylate, hexamethylene-bis-maleimide, divinyl urea, bisphenol A bis-methacrylate, divinyl adipate, glycerin trimethacrylate, trimethylolpropane triacrylate, trivinyl trimellitate, 1,5-pentadiene, 1,3-bis-(4-methacryloxybutyl) tetramethyl disiloxane, divinyl ether and divinyl sulfone; hydroxyl reactive compounds such as polyvalent isocyantes e.g. hexamethylene diisocyanate, isophorone diisocyanate, toluene diisocyanate, polyaldehydes e.g. glutaraldehyde and glyoxal; polyacids e.g. glutaric acid and oxalic acid; polyepoxides e.g. butane diepoxide, vinylcyclohexane dioxide and butanediol diglycidyl ether; polyols (acid catalysis) e.g. dimethylol urea and dimethylol urea and diethylene glycol.

When employed, about 0.01 to 10 weight percent of crosslinking agent, based upon the weight formula I derivative, may be present, preferably about 0.01 to about 5 percent, most preferably about 0.05 to 2 weight percent.

The resultant contact lenses are optically clear strong, flexible, highly oxygen permeable and wettable. Further, the instant lenses are characterized by their ease of manufacture.

The following examples are presented for the purpose of illustration only and are not to be construed to limit the nature or scope of the instant invention in any manner whatsoever.

EXAMPLE 1

Preparation of HEC-IEM Macromer

Dimethyl sulfoxide (95.00 g) is vigorously stirred in a 300 ml three-necked round bottomed flask equipped with nitrogen inlet, reflux condenser, and mechanical stirring apparatus. Hydroxyethyl cellulose, CELLOSIZE HEC, Union carbide, MW 120, 000 (5.00 g) is dispersed in the solvent and subsequently dissolved at 60° C. After cooling to room temperature, 2-isocyanatoethyl methacrylate (2.09 g, 22.4 mole %)* is added to the vigorously stirred solution. Completion of the reaction is evidenced by the disappearance of the NCO absorption at 2270 cm$^{-1}$. The clear, viscous solution product is stored at room temperature under nitrogen.

* 22.4% with respect to the moles of hydroxyl group on the HEC; i.e. 22.4% of all hydroxyls.

EXAMPLES 2–10

The macromer synthesis described in Example 1 repeated using varying amounts of 2-isocyanatoethyl methacrylate (IEM):

| Example | IEM (g) | Mole %* |
|---|---|---|
| 2 | 0.93 | 10.0 |
| 3 | 1.21 | 13.0 |
| 4 | 1.55 | 16.7 |
| 5 | 1.67 | 18.0 |
| 6 | 2.23 | 24.0 |
| 7 | 2.51 | 27.0 |
| 8 | 3.10 | 33.3 |
| 9 | 3.72 | 40.0 |
| 10 | 4.65 | 50.0 |

*with respect to the moles of hydroxyl group present on the HEC.

EXAMPLE 11

Twenty grams of the macromer solution in dimethyl sulfoxide of Example 1 (22.41 mole % IEM) is stirred under nitrogen with methyl methacylate (MMA) (0.604 g, 30% with respect to HEC-IEM solids) and 8.00 mg benzoin methyl ether. The solution is poured into 5" (12.7 cm) square, 0.5 mm thick, glass molds lined with MYLAR film and irradiated for six hours with two 15 watt BLACK RAY UV light bulbs. The solvent swollen crosslinked polymer is extracted three times with 60° C. distilled water to give a clear, highly wettable hydrogel with the following properties:

| Modulus | 145 | Dynes/cm$^2$ × 10$^{-5}$ |
|---|---|---|
| Stress | 67 | " |
| Elongation | 46% | |
| H$_2$O Content | 81% | |

EXAMPLES 12-23

| Example | Mole % IEM based on OH Groups in HEC | % MMA by Weight | Stress * | Modulus * | Elongation (%) | H$_2$O Content (%) |
|---|---|---|---|---|---|---|
| 12 | 18 | 27 | 54 | 104 | 46 | 89 |
| 13 | 18 | 40 | 96 | 187 | 48 | 85 |
| 14 | 18 | 50 | 105 | 197 | 53 | 79 |
| 15 | 18 | 60 | 162 | 281 | 53 | 70 |
| 16 | 18 | 70 | 306 | 626 | 53 | 63 |
| 17 | 24 | 20 | 77 | 162 | 55 | 85 |
| 18 | 24 | 30 | 106 | 204 | 50 | 76 |
| 19 | 24 | 40 | 125 | 294 | 54 | 65 |
| 20 | 27 | 25 | 86 | 217 | 42 | 78 |
| 21 | 27 | 30 | 124 | 263 | 61 | 74 |
| 22 | 27 | 35 | 138 | 275 | 51 | 71 |
| 23 | 27 | — | 114 | 366 | 23 | 91 |

*Dynes/cm$^2$ · 10$^{-5}$

EXAMPLE 24

Twenty grams of the macromer solution in dimethyl sulfoxide of Example 1 is stirred under nitrogen with methyl methacrylate (0.604 g), and 8.00 mg benzoin methyl ether as described in Example 11. Four drops of the resulting solution is added to each of twenty poly(propylene) lens molds under nitrogen, capped, and then irradiated for six hours with two 15 watt BLACK RAY UV light bulbs. The solvent swollen crosslinked lenses are dropped into 60° C. distilled water. The extracted lenses sink to the bottom of the flask to give clear highly wettable strong contact lenses.

What is claimed is:

1. A hydrogel contact lens which comprises an organic aprotic solvent-insoluble, highly wettable, oxygen permeable polymer which is the copolymerization product of (A) a derivative of hydroxyethyl cellulose with a D.S. value of 0.5 to 3.0 and an M.S. value of 1.5 to 3.0, having a weight average molecular weight of at least 10,000, containing an amount between about 0.5% to 90%, based on the total number of hydroxyl groups on said hydroxyethyl cellulose, of a repeating structural unit of formula I

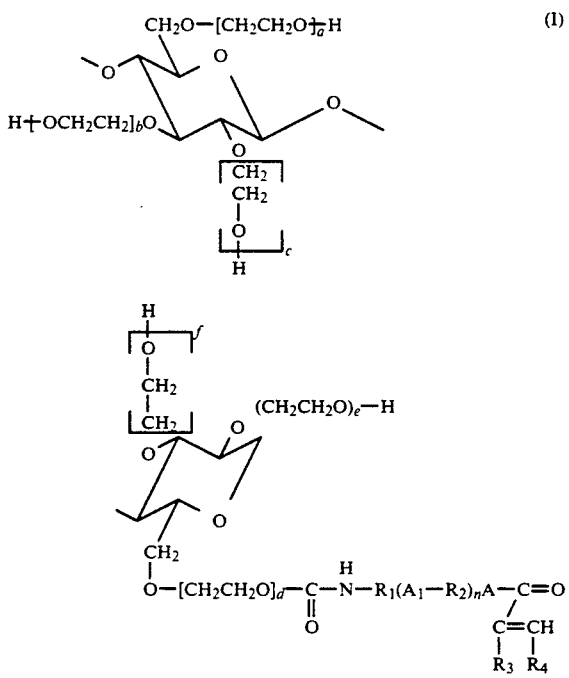

$a+b+c+d+e+f \geq 3$, with a urethane bond of any one or more of the six possible hydroxyl positions, $R_1$ and $R_2$ are independently straight or branched chain alkylene of 2 to 8 carbon atoms, arylene of 6 to 12 carbon atoms, a saturated cycloaliphatic divalent group of 6 to 15 carbon atoms, aralkylene of 7 to 14 carbon atoms, or aralkarylene of 13 to 16 carbon atoms;

n is 0 is 1;

$A_1$ is —NHCO—O— or —NHCO—NR'— where R' is hydrogen or lower alkyl;

A is —O—, —NH— or —NHCONR"— where R" is hydrogen or lower alkyl;

$R_3$ is hydrogen or methyl; and $R_4$ is hydrogen, methyl or —COOR$_5$ where $R_5$ is hydrogen or lower alkyl with the proviso that when $R_3$ is methyl, $R_4$ is hydrogen; and (B) a vinylic monomer where for each repeating structural unit of formula I there are 0.01 to 80 repeating structural units derived from the vinylic monomer.

2. A contact lens according to claim 18 wherein the vinylic monomer of component (B) is selected from the group consisting of (a) hydrophilic monomers selected from hydroxy substituted lower alkyl acrylates and methacrylates, acrylamide and methacrylamide, $C_1$-$C_2$ lower alkyl acrylamide and methacrylamide, ethoxylated acrylates and methacrylates, hydroxy substituted lower alkyl acrylamide and methacrylamide, hydroxy substituted lower alkyl vinyl ethers, sodium ethylene sulfonate, sodium styrene sulfonate, 2-acrylamide-2-methylpropanesulfonic acid, N-vinylpyrrole, N-vinylsuccinimide, N-vinylpyrrolidone, 2- and 4-vinylpyridine, acrylic acid, methacrylic acid, (amino and quaternary ammonium)-(mono or di-) lower alkylamino-lower alkyl-(acrylates and methacrylates) and allyl alcohol;

(b) hydrophobic monomers selected from $C_1$ to $C_{18}$ alkyl acrylates and methacrylates, $C_8$ to $C_{18}$ alkyl acrylamides and methacrylamides, isobornyl methacrylate, acrylonitrile, methacrylonitrile, vinyl $C_1$ to $C_{18}$ alkanoates, $C_2$ to $C_{18}$ alkenes, $C_2$ to $C_{18}$ haloalkenes, styrene, $C_1$ to $C_6$ alkyl styrenes, vinyl alkyl ethers wherein the alkyl portion has 1 to 6 carbon atoms, $C_3$-$C_{12}$ perfluoroalkyl-ethyl-thiocarbonylaminoethyl acrylates and methacrylates, acryloxy and methacryloxy-alkyl-siloxanes, N-vinylcarbazole and $C_1$-$C_{12}$ alkyl esters of maleic, fumaric, itaconic and mesaconic acids; and (c) a mixture of (a) and (b).

3. A contact lens according to claim 1 wherein the polymer contains between about 0.5 and about 30 units derived from the vinylic monomer per each unit of formula I.

4. A contact lens according to claim 3 wherein the polymer contains between about 2 and about 20 units derived from the vinylic monomer per each unit of formula I.

5. A contact lens according to claim 3 where in the polymer in formula I, $R_1$ and $R_2$ are alkylene of 2 to 6 carbon atoms.

6. A contact lens according to claim 5 where in the polymer in formula I, n is zero and A is —O—.

7. A contact lens according to claim 6 where in the polymer in formula I, $R_1$ is ethylene.

8. A contact lens according to claim 3 wherein the polymer contains from at least about 1 percent to about 50 percent of units of formula I, based on the number of hydroxyl groups on the hydroxyethyl cellulose.

9. A contact lens according to claim 7 where in the polymer the hydroxyethyl cellulose contains at least about 1 to about 50 percent of units of formula I based on the number of hydroxyl groups on said hydroxyethyl cellulose, which are reacted with about 0.5 to about 30 units based upon the units of formula I of either a hydrophobic vinylic monomer, or a mixture of hydrophobic and hydrophilic vinylic monomers containing at least 50 percent by weight of hydrophobic monomer based upon the total weight of said vinylic monomers.

10. A contact lens according to claim 1 where in the polymer in formula I, $R_3$ is methyl and $R_4$ is hydrogen.

11. A contact lens according to claim 1 where in the polymer, component (A) is a derivative of hydroxyethyl cellulose containing between about 10 and 50%, based on the total number of hydroxyl groups on said hydroxyethyl cellulose, of a repeating structural unit of formula I where $R_1$ is ethylene, n is zero, A is —O—, $R_3$ is methyl and $R_4$ is hydrogen.

12. A contact lens according to claim 11 wherein component (A) is a derivative of hydroxyethyl cellulose contain about 12 to 27% of repeating structural units of formula I.

13. A contact lens according to claim 11 wherein component (B) is methyl methacrylate.

* * * * *